United States Patent [19]
Ghestem

[11] Patent Number: 4,521,978
[45] Date of Patent: Jun. 11, 1985

[54] HEAT EXCHANGER FOR THERMALLY TREATING A PULVERULENT MATERIAL

[75] Inventor: Gérard Ghestem, Santes, France

[73] Assignee: Fives-Cail Babcock, Paris, France

[21] Appl. No.: 558,938

[22] Filed: Dec. 7, 1983

[30] Foreign Application Priority Data

Dec. 14, 1982 [FR] France ................... 82 20909

[51] Int. Cl.³ ............................................ F26B 17/14
[52] U.S. Cl. ................................... 34/57 R; 34/57 A; 34/57 E; 432/58
[58] Field of Search ................. 34/57 R, 57 E, 57 A, 34/10; 432/15, 58, 168, 178

[56] References Cited

U.S. PATENT DOCUMENTS 3,319,349  5/1967  Heinemann ..................... 34/57 E Primary Examiner—Larry I. Schwartz
Attorney, Agent, or Firm—Kurt Kelman

[57] ABSTRACT

To cut building and operating costs, a heat exchange apparatus for thermally treating a pulverulent material by a countercurrent flow of gas comprises a series of superposed successive separators, each separator having a cylindrical body with a horizontal axis and the cylindrical body having two ports at respective ends and another port at a mid-point thereof. Gas ducts connect the successive separators in series so that the smoke gas flows from a furnace in a current through the successive separators in a first direction. Respective gas ducts lead to and from the ports of respective separators tangentially with respect to the cylindrical body thereof.

5 Claims, 4 Drawing Figures

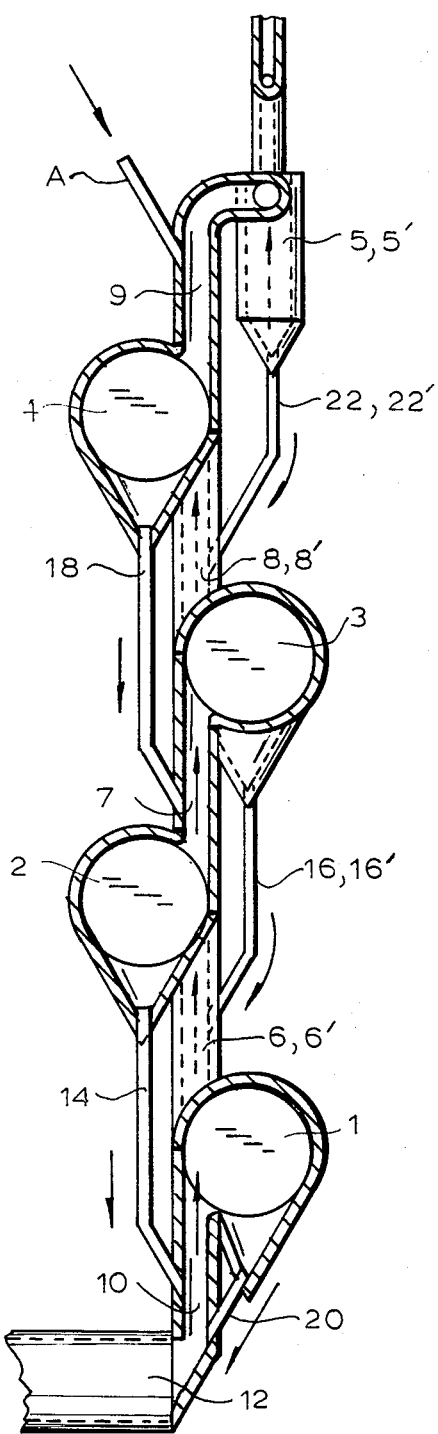
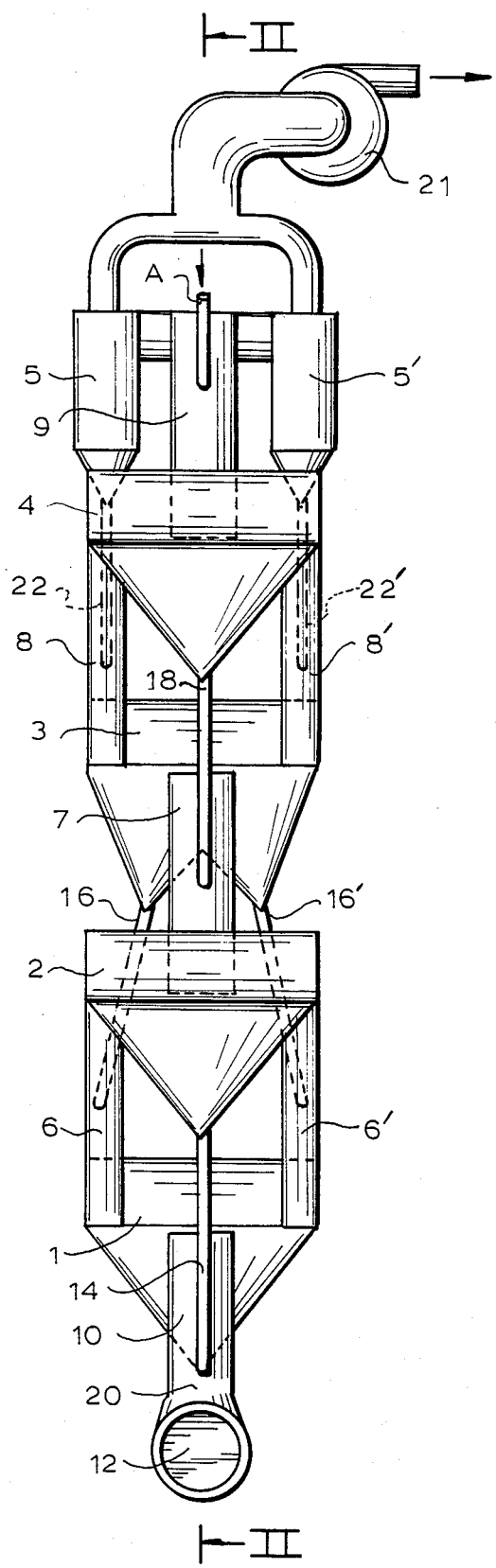

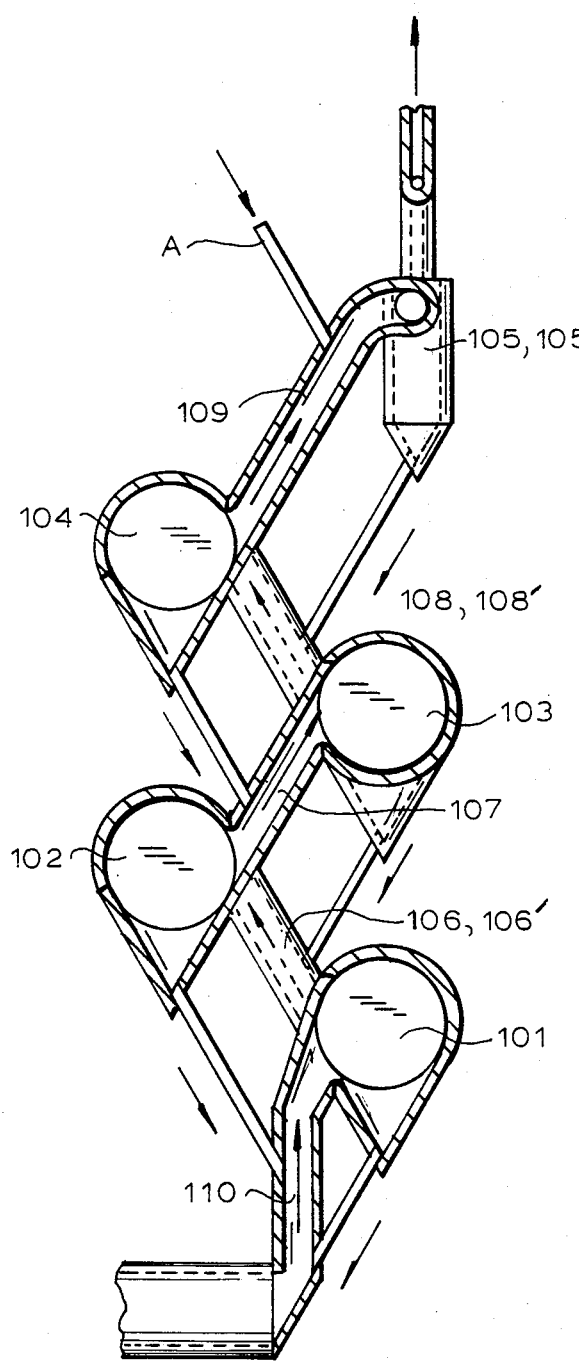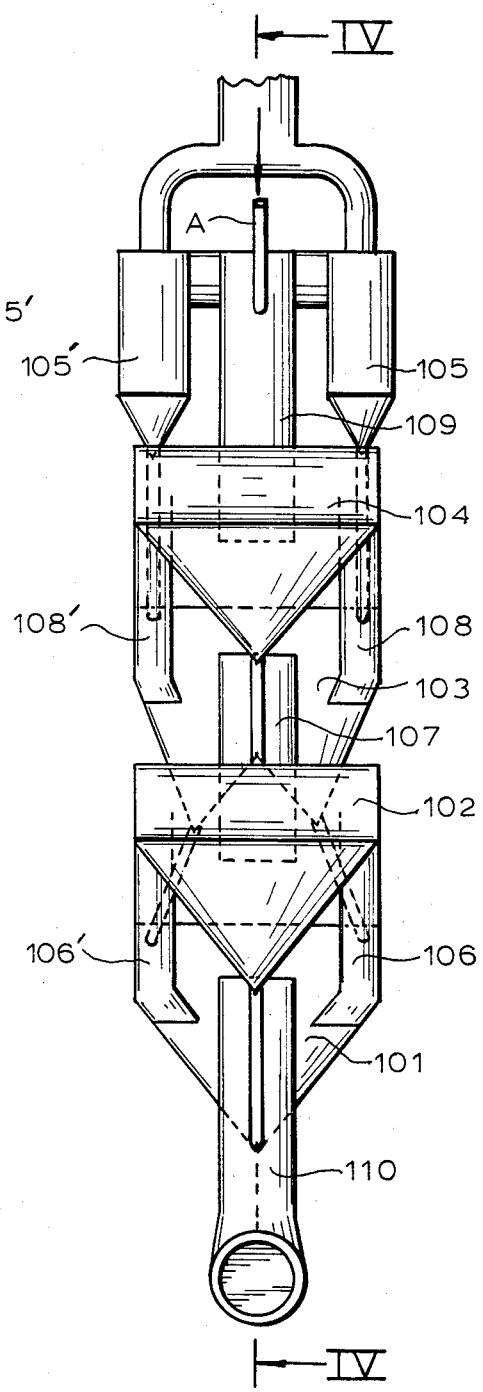

HEAT EXCHANGER FOR THERMALLY TREATING A PULVERULENT MATERIAL

The present invention relates to a heat exchange apparatus for thermally treating a pulverulent material by a countercurrent flow of a gas, and more particularly to the type of heat exchanger comprising a series of successive separators, gas duct means connecting the successive separators in series so that the gas flows from a source of the gas in a current through the successive separators in a first direction, means for feeding the pulverulent material to be treated into the gas duct means remote from the gas source and beyond a last one of the separators whereby the pulverulent material passes into the last separator suspended in the gas current and is separated therefrom in the separator, and conduit means connecting the separators for delivering the separated pulverulent material suspended in the gas current from the last to a succeeding separator in a second direction countercurrent to the first direction and so on to the first separator.

The separators in known heat exchange apparatus of this type are constituted by cyclones having a vertical axis and considerable height. Since the series-connected cyclones are usually superposed to permit the material to be treated to flow from one cyclone to the other by gravity, the total height of such apparatus is substantial and the cost of the framework supporting the cyclones is high.

In addition, conventional cyclones create considerable pressure losses in the gas flow and require powerful blowers for drawing the gas through the duct means. Therefore, they are expensive and consume excessive amounts of energy.

It is the primary object of this invention to overcome these disadvantages and, more particularly, to reduce the engineering costs for building such a plant, thus lowering not only the initial investment but also the operating expenses of this type of heat exchanger.

The above and other objects are accomplished according to the invention with a series of separators, each one of the separators having a cylindrical body with a horizontal axis and the cylindrical body of at least one of the separators has two inlets at respective ends and an outlet at a mid-point thereof. Gas duct means connects the successive separators in series so that the gas flows from a source of the gas in a current through the successive separators in a first direction. The gas duct means includes gas ducts connecting the one separator to a preceding one and a succeeding one of the separators, the gas ducts respectively leading to the inlets and leading from the outlet of the one separator tangentially with respect to the cylindrical body. The pulverulent material to be treated is fed into the gas duct means remote from the gas source whereby the pulverulent material passes into each one of the separators suspended in the gas current and is separated therefrom in the separators. Conduit means connect the separators for delivering the separated pulverulent material from a respective one of the separators to a separator preceding the same in the first direction.

In the preferred embodiments described and illustrated herein, the separators have funnel-shaped hoppers in communication with the cylindrical bodies thereof for receiving and collecting the separated pulverulent material, each funnel-shaped hopper having an outlet point connected by the conduit means to the gas duct means leading to the inlet or inlets of the separator preceding in the first direction. Such horizontally extending separators have less height than vertical cyclones and produce less pressure loss.

The above and other objects, advantages and features of the invention will become more apparent from the following detailed description of two now preferred embodiments, taken in conjunction with the accompanying schematic drawing wherein FIG. 1 is a side elevational view of one embodiment of a heat exchange apparatus according to the present invention;

FIG. 2 is a vertical section along line II—II of FIG. 1;

FIG. 3 shows another embodiment in a side elevational view; and

FIG. 4 is a vertical section along line IV—IV of FIG. 3.

FIGS. 1 and 2 illustrate a heat exchange apparatus for thermally treating a pulverulent material by a countercurrent flow of a gas, which comprises a series of successive, superposed separators 1, 2, 3, 4 and twin separators 5, 5'. Except for top twin separator 5, 5', which may be conventional cyclones, each one of the separators has a cylindrical body with a horizontal axis and the cylindrical body of at least one of separators 1 to 4 has two inlets at respective ends and an outlet at a mid-point along the length thereof. Vertically extending gas ducts means 6, 6', 7, 8, 8' and 9 connects the successive separators in series so that the gas flows from source 12 of gas in a current through the successive separators in a first direction indicated by upwardly pointing arrows in the ducts. The illustrated gas source is a furnace or kiln and the gas is smoke gas leaving the furnace or kiln through flue duct 10 leading to a mid-point inlet in first separator 1. Separators 1 to 4 also are cyclones but their axes extend horizontally instead of vertically, as in conventional arrangements. These separators have substantially identical cylindrical bodies open at their bottoms to communicate with funnel-shaped hoppers attached to the open bottoms of the cylindrical bodies, the hoppers having the shape of an inverted pyramid. As shown in FIG. 1, in this embodiment of the heat exchanger, separators 1, 2 and 4 have a single hopper while separator 3 has two such hoppers arranged side-by-side.

According to the invention, the gas duct means includes gas ducts 6, 6', 7 connecting separator 2 to preceding separator 1 and succeeding separator 3. Gas ducts 6, 6' lead to the inlets of separator 2 and gas duct 7 leads from the outlet of the separator tangentially with respect to the cylindrical body thereof, as clearly shown in FIG. 2. In the illustrated embodiment, separators 1 and 3 respectively preceding and succeeding separator 2 each have two outlets at respective ends and an inlet at a mid-point thereof. Thus, flue duct 10 leads tangentially into the mid-point inlet of separator 1 while ducts 6, 6' lead tangentially from the two end outlets of separator 1 to the end inlets of separator 2. Duct 7 leads tangentially from the mid-point outlet of separator 2 to the mid-point inlet of separator 3 and ducts 8, 8' of the gas duct means lead tangentially from the end outlets of separator 3 to the end inlets of separator 4. Duct 9 leads tangentially from the mid-point outlet of separator 4 to twin separators 5, 5' whose inlets are connected to gas duct 9 by branch ducts. The inlet and outlet ports of all the separators are located at the same side of the cylindrical body, with all the gas ducts extending tangentially with respect to the cylindrical bodies. As shown in FIG. 2, alternating ones of separators 1 to 4 are disposed at respective sides of a vertical center plane extending parallel to the horizontal axes of the cylindrical bodies of the separators. In this manner, gas ducts 7, 9 and 10 are aligned along a common vertical axis extending in the center plane and the entire gas duct means extends in this plane. This arrangement is advantageous but not necessary. The number of separators may, of course, all vary.

Means A feeds the pulverulent material to be treated into the gas duct means remote from gas source 12 whereby the pulverant material passes into each separator 1 to 4 suspended in the gas current, is separated from the gas in the separators and passes from one separator to the next one in a second direction countercurrent to the first direction, as indicated by the downwardly pointing arrows. Conduit means including pipes 14, 16, 16', 18 and 22, 22' connect the separators for delivering the separated pulverulent material from a respective separator to a separator preceding the same in the first direction.

As will be clear from the above description of the structure, the pulverulent material fed into the gas duct means at A will be suspended in the upwardly flowing gas current while it falls therethrough by gravity and the gas loaded with the particles of the material to be treated enters each separator tangentially at their end or mid-point inlets. In this manner, the particle-loaded gas stream passes through the separators in a spiral trajectory from the inlet to the outlets or from the inlets to the outlet. In this spiral movement, centrifugal force will cause the particles to be projected against the wall of the cylindrical body of the separator where they glide along the wall and, under the force of gravity, fall to the bottom of the funnel-shaped hoppers attached to the open bottoms of the cylindrical bodies.

In the illustrated embodiment, separator 3, which has two end outlets and a mid-point inlet, comprises two funnels-shaped hoppers. Each funnel-shaped hooper has an outlet point connected to a respective gas duct leading to the inlet of the preceding separator. Thus, pipe 14 leads from the outlet point of the hopper of separator 2 to flue duct 10 leading to the inlet of preceding separator 1. Pipes 16, 16' lead from the outlet point of the hoppers of separator 3 into gas ducts 6, 6' leading to the end inlets of preceding separator 2. Pipe 18 leads from the outlet point of the hopper of separator 4 to gas duct 7 leading to the mid-point inlet of preceding separator 3 and pipes 22, 22' lead from twin cyclones 5, 5' to gas ducts 8, 8' leading to the end inlets of preceding separator 4. Pipe 20 leads from the outlet point of first separator 1 to any apparatus designed for the finishing treatment of the pulverulent material preheated in the heat exchanger, such as furnace or kiln 12.

The operation of this heat exchanger will be understood from the above description of its structure and will be more fully explained hereinafter by way of example in connection with a preheater for pulverulent solid material before it is fed to a rotary kiln, such as used in the calcining of cement:

The smoke gas coming from kiln 12 passes through flue duct 10 into separator 1 and passes therethrough, whereafter it is drawn successively through gas ducts 6, 6' into separator 2, gas duct 7, separator 3, gas ducts 8, 8', separator 4, gas duct 9 and twin cyclones 5, 5'. The outlets of the twin cyclones are connected to the input of blower 21 which circulates the smoke gas through the heat exchange apparatus in a manner well known per se.

The pulverulent material enters the preheater at A in gas duct 9, is entrained in suspension by the gas current and enters cyclones 5, 5'. The particles are there separated from the gas and fall to the bottom of the cyclones whence pipes 22, 22' convey them by gravity into gas ducts 8, 8'. The gas current in these ducts entrains the particles into separator 4 where, as previously explained, they will be separated from the gas as the gas loaded with the particles swirls from the two end inlets towards the mid-point outlet. Centrifugal force will project the particles against the wall of the cylindrical body of this separator and the separated particles will fall into the hopper thereof whence pipe 18 will convey them into gas duct 7. The gas current in this gas duct will convey the particles into separator 3 where the same phenomenon occurs and the separated particles will fall into the two hoppers of this separator to be conveyed by pipes 16, 16' into gas ducts 6, 6' in which they are entrained into separator 2. It would be possible to provide separator 3 also with a single hopper but, in this case, it would be necessary to connect two pipes to the outlet point of the single hopper to feed the particles into the two gas ducts 6, 6'. The particles are again separated from the gas in separator 2 and pipe 14 delivers the separated particles to flue duct 10 in which they are entrained into separator 1. The particles separated in this separator are introduced into kiln 12 by pipe 20.

At least over part of their trajectory, the particles and the gas circulate in the same direction in the gas duct means and in the separators but, in passing from one separator to the other, they circulate in opposite directions so that a very efficient heat exchange between the hot smoke gas and the pulverulent material is effected by a countercurrent flow of gas.

The structure and operation of the embodiment of FIGS. 3 and 4 will be readily understood from the above description since it does not differ in principle from the first-described embodiment but provides a different arrangement of the gas duct means to reduce the height of the apparatus even further. As best shown in FIG. 4, gas ducts 106, 106', 108, 108, 108' and 109 connecting successive separators 101, 102, 103, 104, 105 and 105' are alternatingly inclined in opposite directions with respect to the vertical center plane of the heat exchanger. This disposition of the gas duct means reduces the height of the apparatus while increasing its width. This embodiment may be particularly useful when installed in areas where there is danger of earth quakes.

While the heat exchange apparatus of the present invention may be self-supporting, it may be supported on a suitable frame or support tower.

What is claimed is:

1. A heat exchange apparatus for thermally treating a pulverulent material by a countercurrent flow of a gas, which comprises
   (a) a source of the gas,
   (b) a series of alternating types of at least two superposed separators, each one of the separators having a cylindrical body with a horizontal axis, one of the separator types having an inlet at a mid-point of the cylindrical body and two outlets at respective ends thereof, and the other separator type having an outlet at a mid-point of the cylindrical body and two inlets at respective ends thereof, (c) gas duct means connecting the superposed separators to the source of gas so that the gas flows from the source of gas in series to successive ones of the separators, the gas duct means comprising
   (1) a first gas duct leading tangentially with respect to the cylindrical body to the inlet of each one of the separators having the inlet at the mid-point thereof, and
   (2) second gas ducts leading tangentially with respect to the cylindrical bodies from the outlets of each one of the separators having two outlets to the inlets of a succeeding one of the separators having two inlets at the respective ends,
(d) means for feeding the pulverulent material to be treated into the gas duct means remote from the gas source whereby the pulverulent material passes into each one of the separators suspended in the gas current and is separated therefrom in the separators, and
(e) conduit means connecting the separators for delivering the separated pulverulent material from a respective one of the separators to a separator preceding the same in the direction of the gas flow.

2. The heat exchange apparatus of claim 1, wherein the separators are alternatingly disposed at respective sides of a vertical center plane extending parallel to the axes.

3. The heat exchange apparatus of claim 2, wherein the gas ducts are alternatingly inclined in opposite directions with respect to the vertical center plane.

4. The heat exchange apparatus of claim 1, wherein at least one of the separators having two end outlets and a mid-point inlet comprises two funnel-shaped hoppers in communication with the cylindrical body thereof and receiving the separated pulverulent material, each funnel-shaped hopper having an outlet point connected to a respective one of the gas ducts leading to the inlet of the preceding separator.

5. A heat exchange apparatus for thermally treating a pulverulent material by a countercurrent flow of a gas, which comprises
   (a) a series of successive separators, each one of the separators having a cylindrical body with a horizontal axis and the cylindrical body of at least one of the separators has two inlets at respective ends and an outlet at a mid-point thereof,
   (b) gas duct means connecting the successive separators in series so that the gas flows from a source of the gas in a current through the successive separators in a first direction, the gas duct means including
      (1) gas ducts connecting the one separator to a preceding one and a succeeding one of the separators, the gas ducts respectively leading to the inlets and leading from the outlet of the one separator tangentially with respect to the cylindrical body thereof,
   (c) means for feeding the pulverulent material to be treated into the gas duct means remote from the gas source whereby the pulverulent material passes into each one of the separators suspended in the gas current and is separated therefrom in the separators, and
   (d) conduit means connecting the separators for delivering the separated pulverulent material from a respective one of the separators to a separator preceding the same in the first direction.

* * * * *